United States Patent
Liu et al.

(10) Patent No.: US 11,018,845 B1
(45) Date of Patent: May 25, 2021

(54) QUARTER-RATE SERIAL-LINK RECEIVER WITH LOW-APERTURE-DELAY SAMPLERS

(71) Applicant: The Regents of the University of California, Oakland, CA (US)

(72) Inventors: Chang Liu, Davis, CA (US); Xiaoguang Liu, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 17/046,250

(22) PCT Filed: Apr. 5, 2019

(86) PCT No.: PCT/US2019/026097
§ 371 (c)(1),
(2) Date: Oct. 8, 2020

(87) PCT Pub. No.: WO2019/199609
PCT Pub. Date: Oct. 17, 2019

Related U.S. Application Data

(60) Provisional application No. 62/655,064, filed on Apr. 9, 2018.

(51) Int. Cl.
*H04L 7/00* (2006.01)
*H04L 25/03* (2006.01)
*H04L 7/033* (2006.01)

(52) U.S. Cl.
CPC .......... *H04L 7/0087* (2013.01); *H04L 7/0331* (2013.01); *H04L 25/03063* (2013.01); *H04L 2025/03509* (2013.01)

(58) Field of Classification Search
CPC .................. H04L 7/0031; H04L 25/03063
See application file for complete search history.

(56) References Cited

U.S. PATENT DOCUMENTS

| 6,434,706 | B1 | 8/2002 | Jensen et al. |
| 2001/0053100 | A1 | 12/2001 | Manning |
| 2005/0275470 | A1 | 12/2005 | Choi |

FOREIGN PATENT DOCUMENTS

WO          2004045064 A1     5/2004

OTHER PUBLICATIONS

Rahman, Wahid, "A 36-Gb/s Adaptive Baud-Rate CDR With CTLE and 1-Tap DFE in 28-nm CMOS", IEEE Journal of Solid-State Circuits, vol. 52, Issue 12, pp. 3517-3519, Oct. 16, 2017.

*Primary Examiner* — Curtis B Odom
(74) *Attorney, Agent, or Firm* — Park, Vaughan, Fleming & Dowler LLP

(57) ABSTRACT

The disclosed embodiments provide a system that implements a low-aperture-delay sampler. The system includes a sampler input, which receives an input signal, and a clock input, which receives a clock signal. The system also includes: a first sampling channel, which samples the input signal when the clock signal is low and is associated with a previous clock phase; and a second sampling channel, which samples the input signal when a rising edge is received in the clock signal, wherein the rising edge is associated with a present clock phase. The system additionally includes a combining mechanism, which combines outputs of the first and second sampling channels to produce a sampler output with a significantly reduced aperture delay.

20 Claims, 14 Drawing Sheets

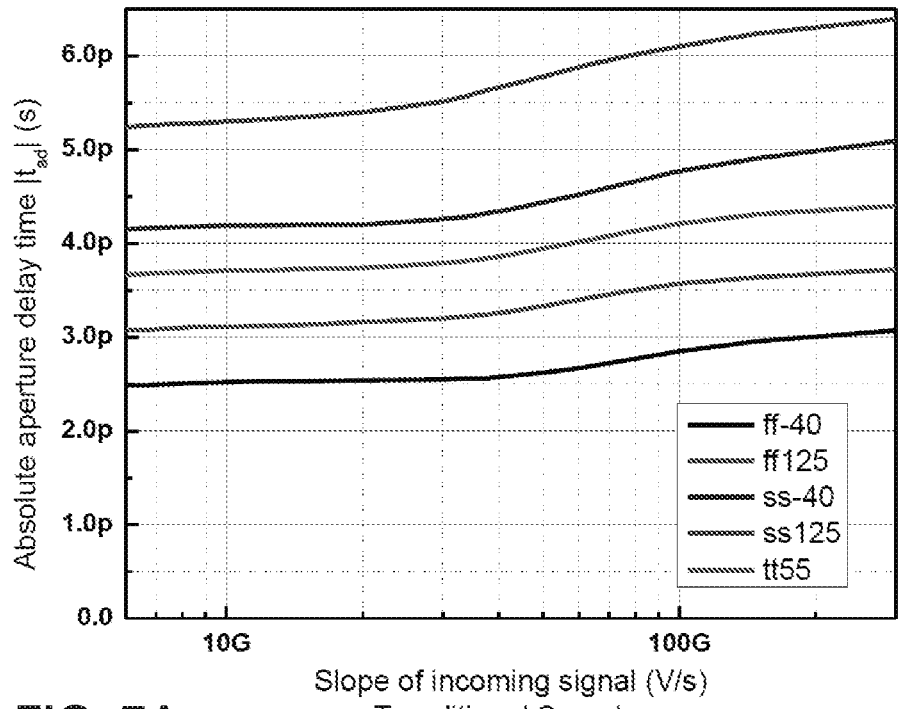
FIG. 7A  Tranditional Sampler
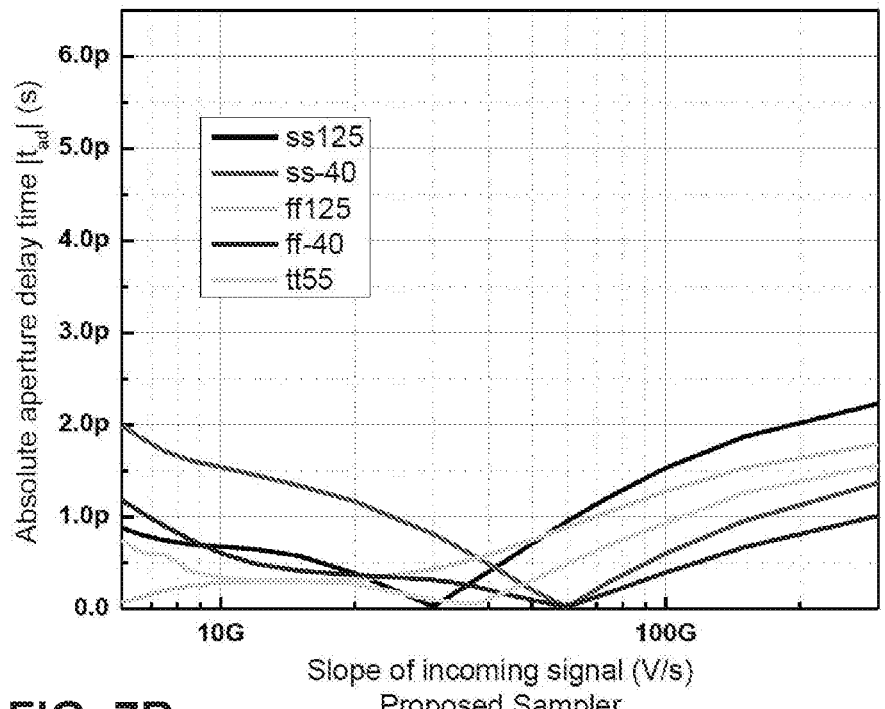
FIG. 7B  Proposed Sampler

QUARTER-RATE SERIAL-LINK RECEIVER WITH LOW-APERTURE-DELAY SAMPLERS

RELATED APPLICATION

This application claims priority under 35 U.S.C. § 119 to U.S. Provisional Application No. 62/655,064, entitled "Quarter-Rate Serial Link Receiver with Low Aperture Delay Samplers" by the same inventors as the instant application, filed on 9 Apr. 2018, the contents of which are incorporated herein by reference.

BACKGROUND

Field

The disclosed embodiments generally relate to systems that facilitate data communications between a source and a receiver. More specifically, the disclosed embodiments relate to the design of a quarter-rate serial-link receiver that provides low aperture delays.

Related Art

Serial links are commonly used to provide chip-to-chip interconnects in network systems. With the recent dramatic growth of multimedia sharing, cloud computing and virtual reality, the data rate in serial links continues to increase. At present, 25-28 Gb/s serial links have been approved under various standards, such as the 32GFC Fibre Channel standard, the InfiniBand Enhanced Data Rate (EDR) standard, and the Common Electrical I/O CEI-28G standard. Also, 38-64 Gb/s transceivers are likely to play a key role in next-generation data communication systems.

Traditionally, a half-rate continuous-time linear equalizer (CTLE) with a one-tap decision feedback equalizer (DFE) and clock-and-data-recovery (CDR) circuitry are used to build serial-link receivers. However, with the rapid increase in data rates, the total power consumption for such serial-link receivers has increased dramatically when the re-timer circuits operate at half of their baud rate, especially for a CTLE.

Also, given the high-speed nature of these systems and the relatively low noise margins, even small errors in the alignment of clock edges may cause erroneous data to be captured. A conventional sampler (with a relatively large aperture delay) cannot be accommodated into the decreased unit interval (UI) period of modern high-speed communication systems, which results in large recovery clock deviations and decreased jitter tolerance due to degraded signal-to-noise ratios (SNRs). Moreover, deviations in the data sampling clock can cause the threshold of the sampler for a DFE circuit to drift, which introduces additional interference factors that also increase bit errors.

It is important to cancel the input offset voltage for the samplers because samples of the incoming high-speed signals are used to provide inputs for clock adjustments in the CDR circuitry. Accurate sampler threshold adjustments are also required by the DFE. In conventional receivers, input offset-voltage cancellation signals and threshold-adjustment signals are added individually at the output of the sampler. This introduces large parasitic capacitances at the output nodes, which can dramatically decrease the performance of the sampler.

Hence, what is needed is a new design for a serial-link receiver, which does not suffer from the above-described limitations of existing serial-link receiver designs.

SUMMARY

The disclosed embodiments provide a system that implements a low-aperture-delay sampler. The system includes a sampler input, which receives an input signal, and a clock input, which receives a clock signal. The system also includes: a first sampling channel, which samples the input signal when the clock signal is low and is associated with a previous clock phase; and a second sampling channel, which samples the input signal when a rising edge is received in the clock signal, wherein the rising edge is associated with a present clock phase. The system additionally includes a combining mechanism, which combines outputs of the first and second sampling channels to produce a sampler output with a significantly reduced aperture delay.

In some embodiments, the input is an incoming analog signal, and the low-aperture-delay sampler comprises a component in a serial-link receiver, which produces a sampled output of the incoming analog signal.

In some embodiments, the input is an incoming analog signal, and the low-aperture-delay sampler comprises a component in a system that supports simultaneous sampling.

In some embodiments, the system that supports simultaneous sampling comprises one of the following: a high-speed serializer/deserializer (SerDes) system; a time-interleaved analog-to-digital converter (ADC) system; and a direct I/Q demodulation system.

In some embodiments, the system further comprises a memory element, which stores an output of the first sampling channel to facilitate combining the output of the first sampling channel with a subsequently received output of the second sampling channel.

In some embodiments, by combining samples of the input signal from the previous and present clock phases, the low-aperture-delay sampler significantly reduces aperture delay.

The disclosed embodiments also provide a system that implements a serial-link receiver. The system includes: a continuous-time linear equalizer (CTLE); a decision-feedback equalizer (DFE); a sampler; and clock-and-data-recovery (CDR) circuits. The CDR circuits dynamically adjust a DFE threshold and a sampler offset, by performing calculations to determine corresponding DFE-threshold and sampler-offset adjustments in the digital domain, and then combining the DFE-threshold and sampler-offset adjustments into a combined adjustment signal. Next, a digital-to-analog converter (DAC) converts the combined adjustment signal into a corresponding analog adjustment signal, which is fed back into the serial-link receiver through a single tap. (Note that feeding the combined adjustment signal back into the serial-link receiver through the single tap reduces parasitic capacitance as compared with using multiple taps, which increases bandwidth and reduces power consumption.)

In some embodiments, the single tap comprises a pair of transistors coupled to a pair of differential signal lines at the output of the sampler.

In some embodiments, performing the calculations in the digital domain to determine the corresponding DFE-threshold and sampler-offset adjustments enables the results of the calculations to be reused.

In some embodiments, the serial-link receiver comprises a quarter-rate serial-link receiver, wherein: the CTLE is a quarter-rate CLTE; the DFE is a quarter-rate one-tap DFE with eight high-decision-accuracy samplers; and the CDR circuits comprise quarter-rate CDR circuits

BRIEF DESCRIPTION OF THE FIGURES

FIG. 7A presents a graph illustrating absolute aperture delay time for a traditional sampler versus input signal slope.

FIG. 7B presents a graph illustrating absolute aperture delay time for the sampler versus input signal slope for the new sampler design in accordance with the disclosed embodiments.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Details

Figure 1:
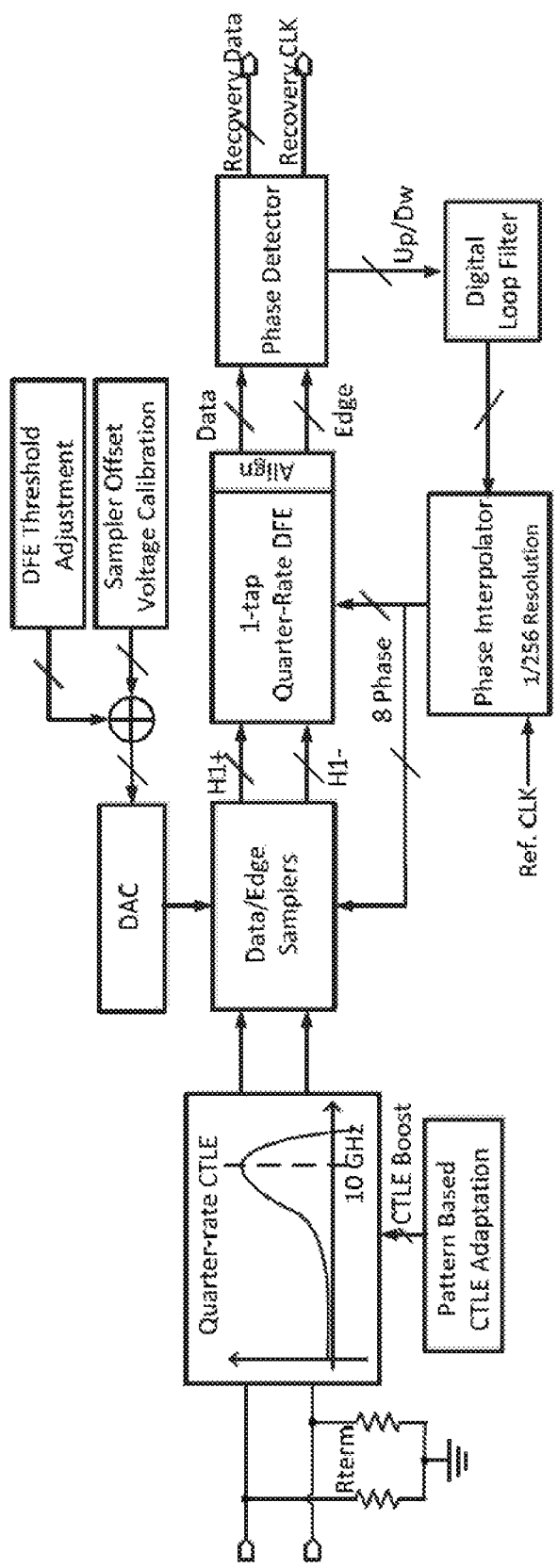
FIG. 1 presents a block diagram of a serial-link receiver in accordance with the disclosed embodiments.

For high-data-rate applications, the disclosed embodiments realize a quarter-rate serial-link receiver with low-aperture-delay samplers. As shown in FIG. 1, the proposed receiver includes: a quarter-rate CTLE to provide a gain boost at a quarter of the baud rate for amplifying the incoming high-speed signals; a quarter-rate one-tap DFE with eight high decision-accuracy samplers; and a quarter-rate CDR circuit to recover the clock and data. Note that the full quarter-rate architecture saves more than half of the power consumption as compared with a half-rate architecture. Moreover, the combination of DFE-threshold adjustment and the sampler-offset calibration through a single signal tap reduces much of the parasitic capacitance at the output nodes of samplers, which improves sampler operating frequency.

Quarter-Rate Architecture

Figures 2A, 2B:
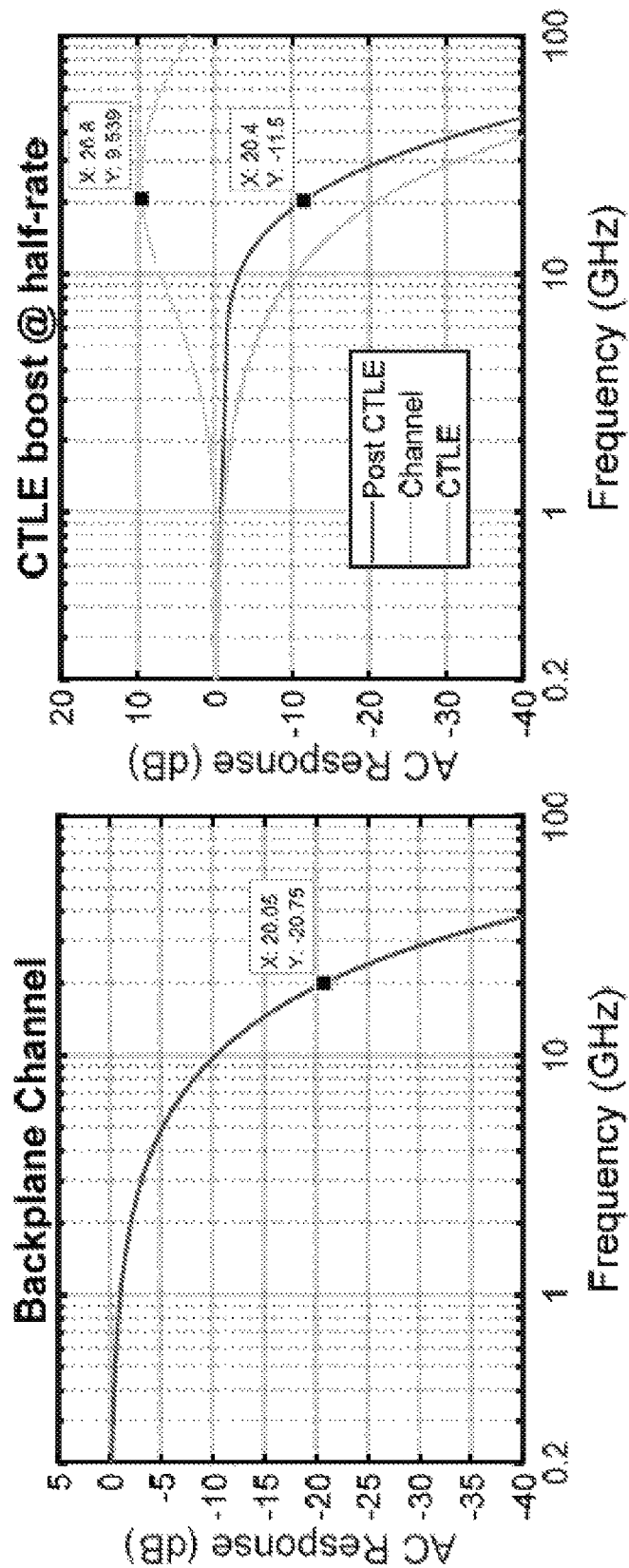
FIG. 2A presents a graph illustrating channel loss in accordance with the disclosed embodiments.
FIG. 2B presents a graph illustrating the AC response of a channel for half-rate CTLE and post CTLE in accordance with the disclosed embodiments.
Figure 2D:
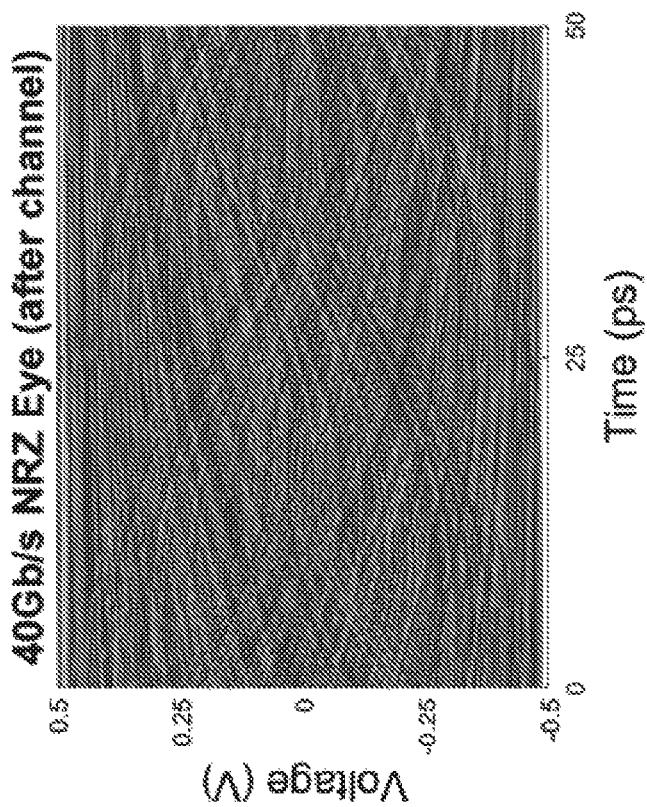
FIG. 2D presents a graph illustrating a signal eye diagram after the channel in accordance with the disclosed embodiments.
Figure 2C:
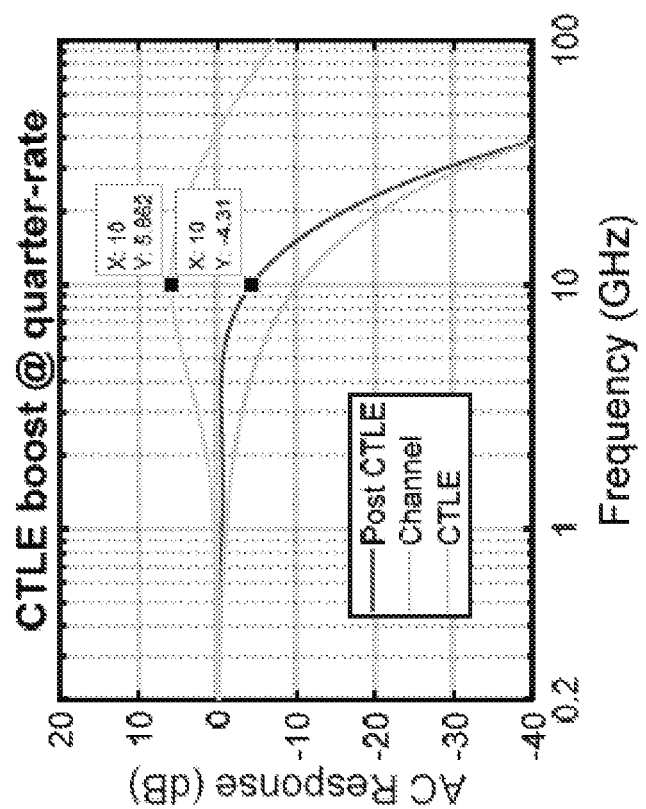
FIG. 2C presents a graph illustrating the AC response of a channel for quarter-rate CTLE and post CTLE in accordance with the disclosed embodiments.
Figure 2F:
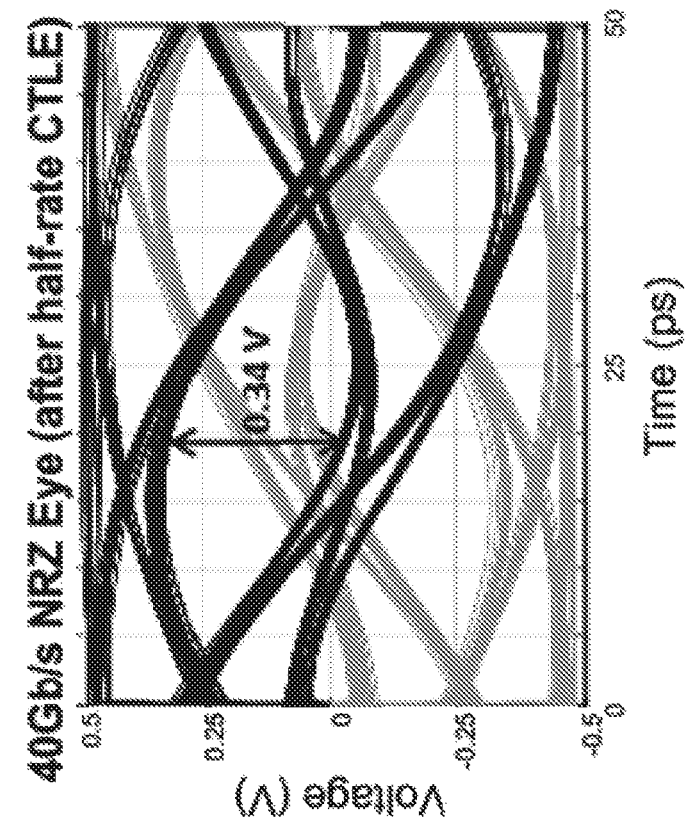
FIG. 2F presents a graph illustrating a signal eye diagram after quarter-rate CTLE in accordance with the disclosed embodiments.
Figure 2E:
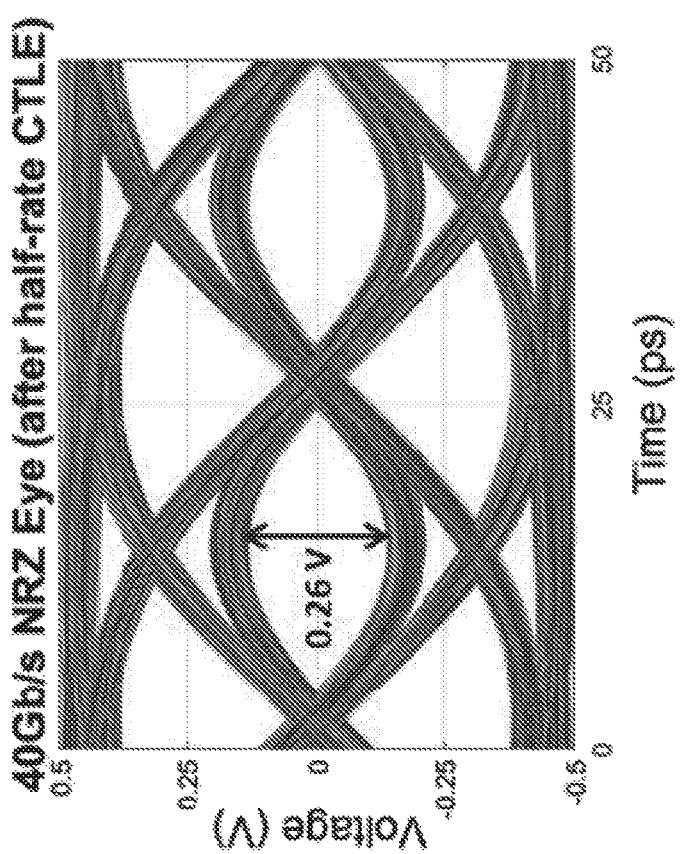
FIG. 2E presents a graph illustrating a signal eye diagram after half-rate CTLE in accordance with the disclosed embodiments.

Because the half-rate frequency intersymbol interference (ISI) is cancelled by the one-tap DFE, the CTLE pole frequency is kept constant around the quarter of the baud rate. Hence, the quarter-rate DFE structure releases the tight timing constraints compared to the half-rate structure and saves a lot power. A simulation comparison of the half-rate structure and the quarter-rate structure is presented in FIGS. 2A-2E. Note that in a one-tap loop-unrolled DFE, two decisions are made at each cycle. Once the previous bit is known, the correct comparator output is chosen. The original eye diagram is split into two eyes (an upper eye and a lower eye) by an amount proportional to the first post-cursor ISI tap, as is shown in FIG. 2F. As is evident from these simulation results, the quarter-rate structure achieves an eye-opening of 0.34 V, which is higher than the 0.26 V eye-opening in the half-rate structure. This verifies that the quarter-rate structure achieves better eye-opening performance while consuming less power.

Aperture Delay Time

Aperture delay time is important not only for the sampler but also for the entire serial-link receiver, because it introduces a fixed delay time between the recovered sampling clock and the high-speed input signal, and this delay time decreases the jitter tolerance of the receiver. The aperture delay time $t_{ad}$ is defined as the relative delay between the sampling clock edge and the actual threshold-crossing point of the input signal. $t_{ad}$ is constant for a specific sampler, and can be positive or negative. A large $t_{ad}$ can cause errors in DFE tap adjustments, thereby degrading the effectiveness of the DFE.

Figure 3:
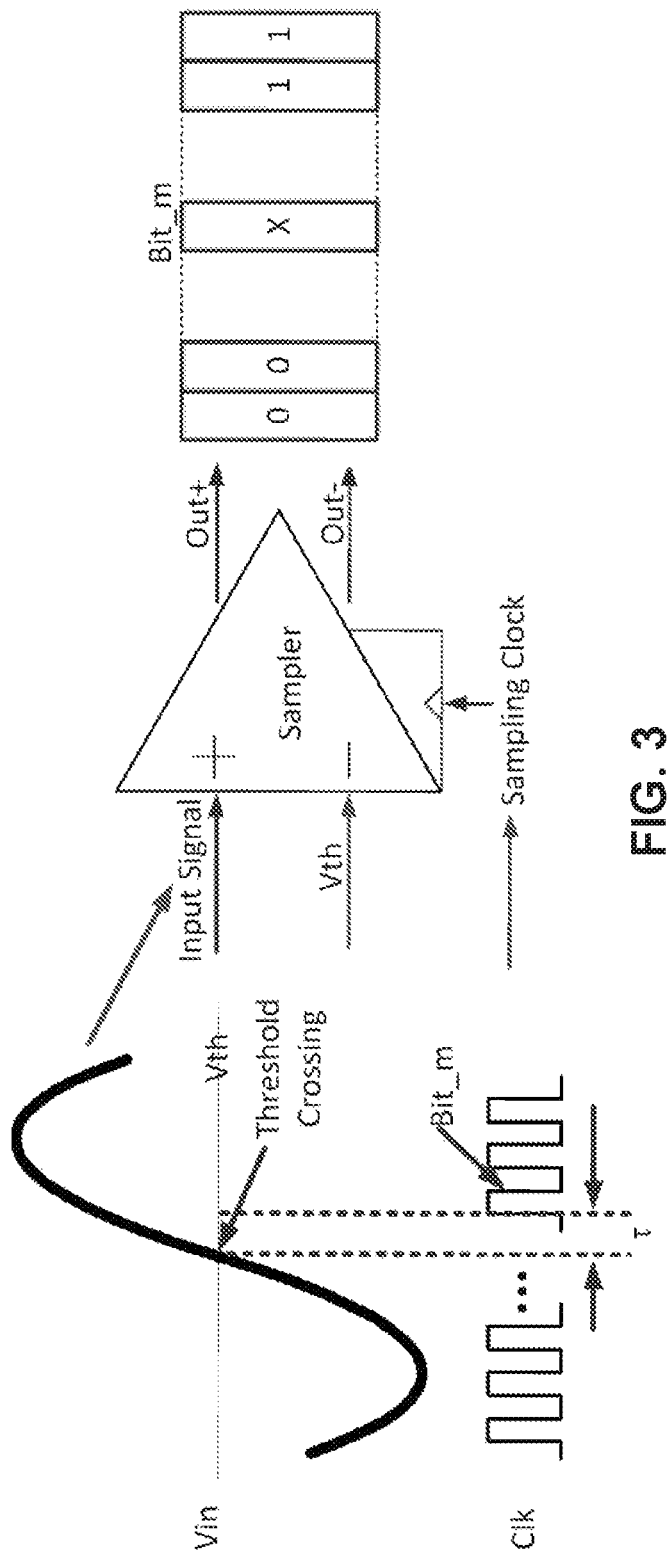
FIG. 3 presents a diagram illustrating the operating process for a sampler in accordance with the disclosed embodiments.

FIG. 3 illustrates the operating process of an exemplary sampler with a low aperture delay time. Ideally, the output of the sampler is expected to flip accurately and sensitively right after the input signal crosses the threshold voltage $V_{th}$. However, in practice, the sampler cannot detect the threshold crossing point accurately and always needs a time delay $\tau$ to respond to the crossing action of the input signal to the output. Hence, the relative delay between the input sampling clock edge and the actual threshold-crossing of the input signal is the aperture delay time $\tau$.

Figure 4:
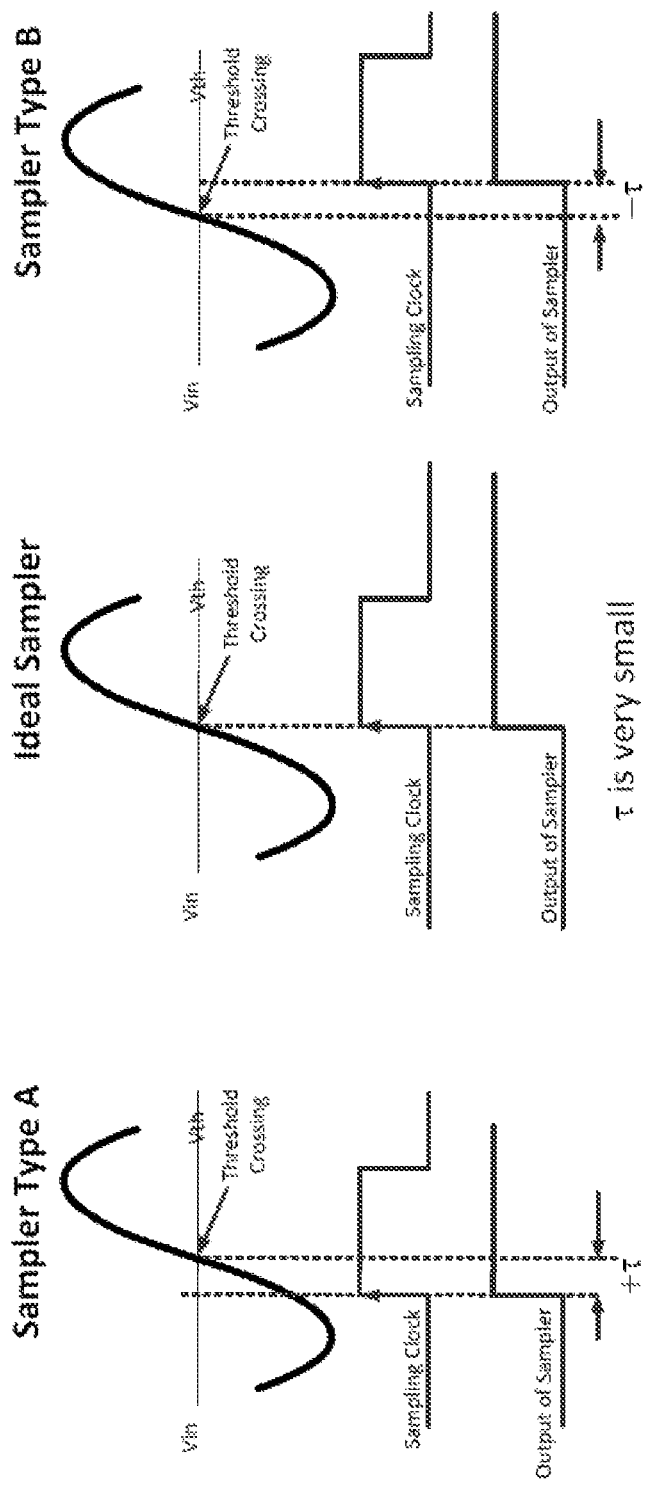
FIG. 4 presents graphs illustrating aperture delay times in accordance with the disclosed embodiments.

Traditional samplers can be categorized into types based on their structure. A type A sampler has a positive $\tau$, which means the output of the sampler will flip before the actual crossing point. In contrast, a type B sampler has a negative $\tau$, which means the output of the sampler will flip after the actual crossing point, as shown in FIG. 4.

Usually, $\tau$ is approximately several picoseconds, which is not a big problem in low-speed applications. However, in high-speed applications, the input signal cycle is also approximately several picoseconds. So in high-speed applications, the decision-time delay caused by $\tau$ can create a significantly degraded system response.

Figure 5A:
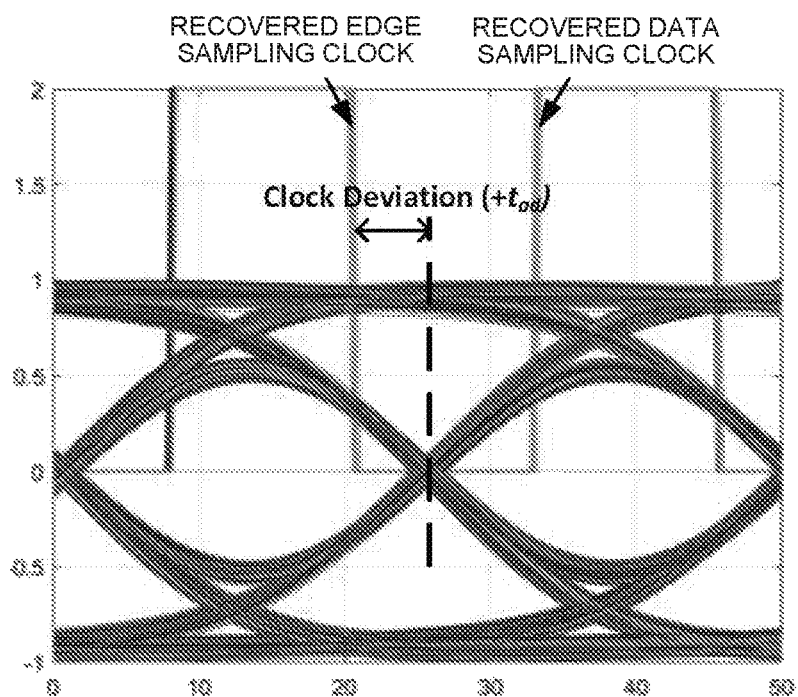
FIG. 5A presents a graph illustrating an eye diagram for a receiver with a conventional positive τ sampler in accordance with the disclosed embodiments.
Figure 5B:
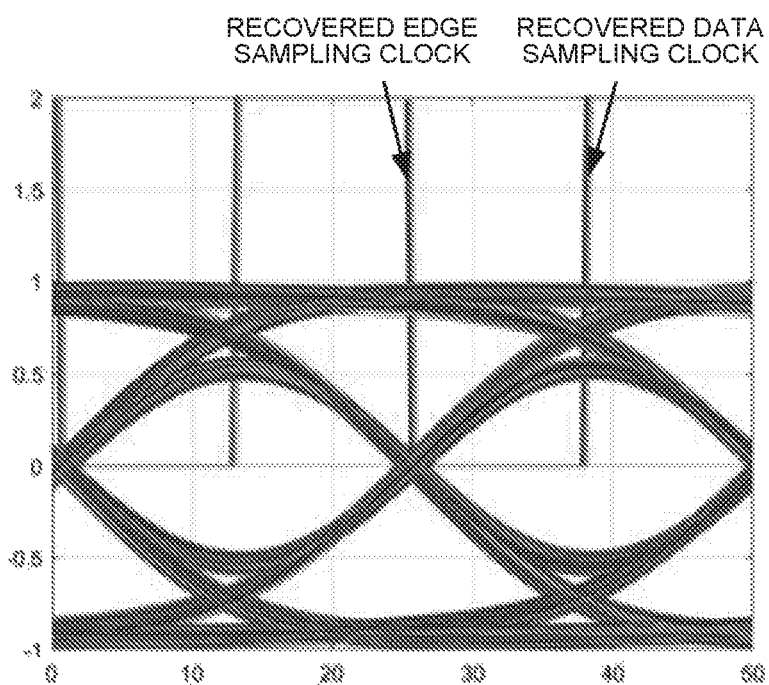
FIG. 5B presents a graph illustrating an eye diagram for a receiver with the new sampler design in accordance with the disclosed embodiments.
Figure 5C:
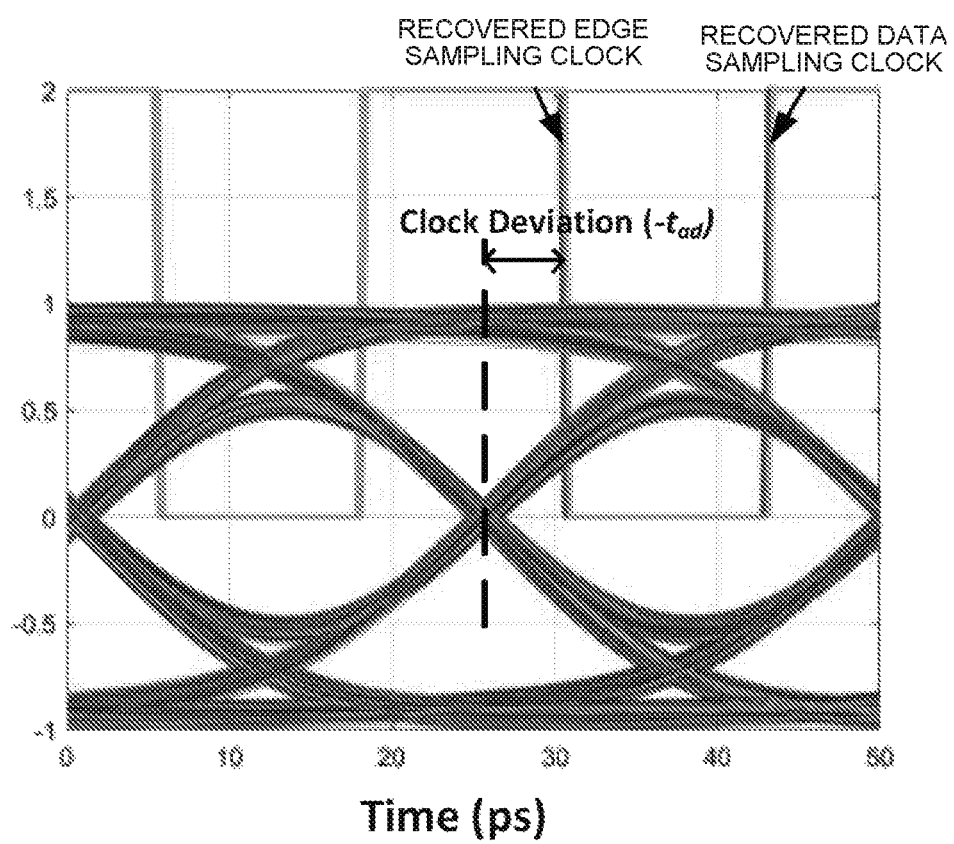
FIG. 5C presents a graph illustrating an eye diagram for a receiver with a conventional negative τ sampler in accordance with the disclosed embodiments.

More specifically, for high-speed SerDes systems (e.g., 40 Gbps), the unit interval time UI is only 25 ps. This means a sampler with a 5 ps aperture delay will seriously degrade system performance. As shown by the simulation results illustrated in FIGS. 5A-5C, the aperture-delay for the sampler will cause a recovered clock deviation, which will decrease the jitter tolerance in SerDes chips.

Proposed Solution to Minimize Aperture Delay

Figure 6A:
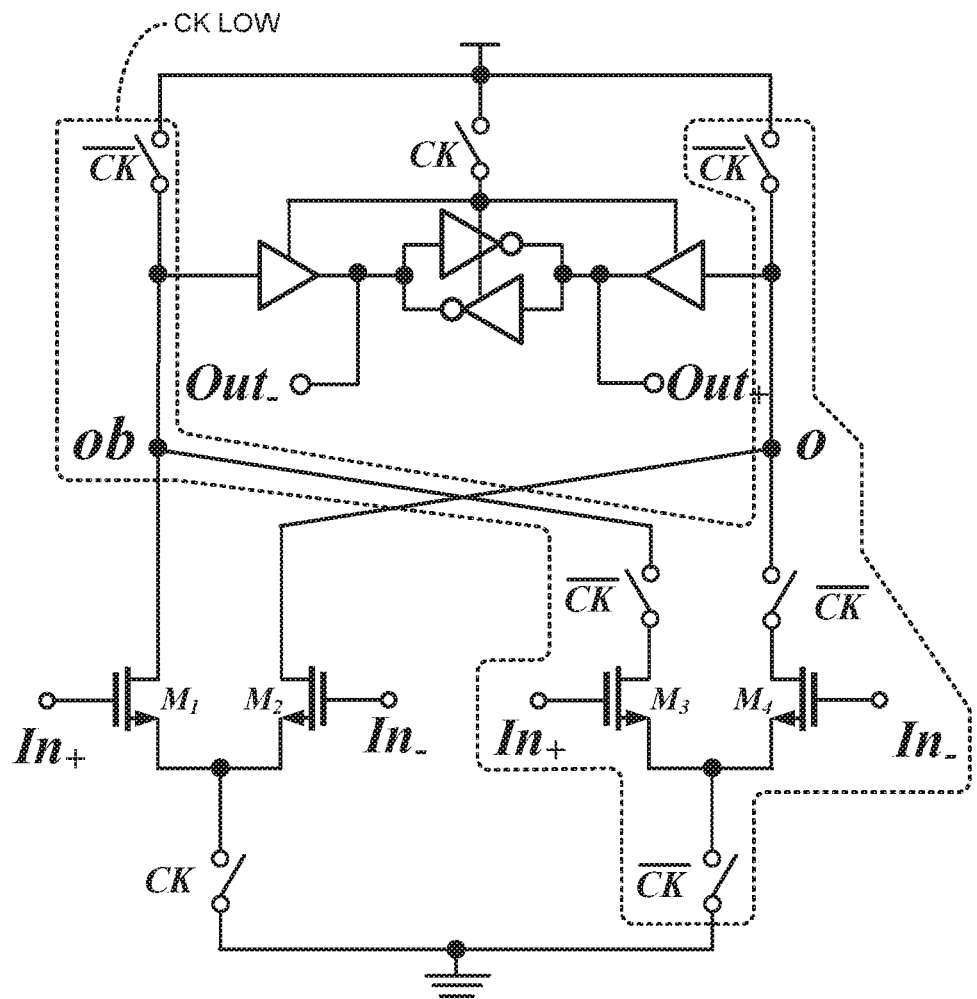
FIG. 6A illustrates active portions of the sampler when the clock signal is low in accordance with the disclosed embodiments.
Figure 6B:
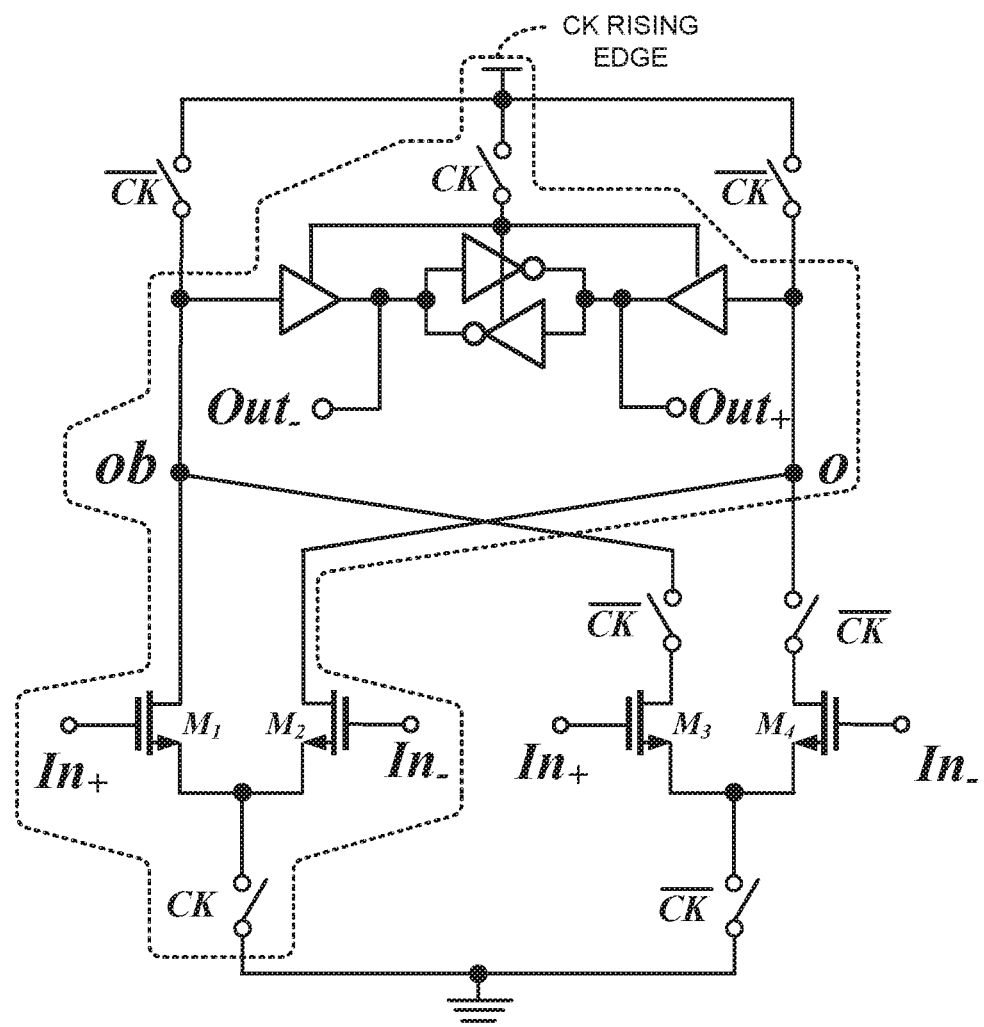
FIG. 6B illustrates active portions of the sampler when the clock signal has a rising edge in accordance with the disclosed embodiments.

To minimize the aperture delay of the sampler, a new sampler structure has been developed, which makes a sampling decision by dual-sampling channels, thereby producing more accurate sampling results. For the traditional samplers, the sampling only occurs at rising or falling clock edges, which causes the aperture delay. This new design takes advantage of the clock-phase immediately preceding the clock edge. Referring to the circuit diagrams for the new sampler illustrated in FIGS. 6A-6B, the actual sampling happens at the rising edge of the clock. However, before the rising edge, the right channel is open to sense the incoming signal when the clock is low, and then stores the results to the nodes "o" and "ob", as is shown in FIG. 6A. When the rising edge of the clock subsequently arrives, the left channel is open and the right channel is closed. Hence, the present input signal information will be combined with the input signal from the previous phase at the nodes "o" and "ob" to generate a more accurate output, especially at the threshold crossing point of the input signal.

FIGS. 7A-7B present simulation results of the absolute aperture delay time of a traditional sampler and the new sampler design versus the input signal slope. As shown in FIG. 7A, the conventional sampler has a relatively large aperture delay time and the variation with the PVT drift is large. For a 40 Gb/s system, the conventional sampler produces an aperture delay time of approximately 5 ps at a typical corner and temperature, while the input signal cycle is only 25 ps. However, the proposed sampler produces less than a 2 ps delay time, and this delay time is 0.0 ps under some input slope conditions, as is shown in FIG. 7B. Hence, the proposed sampler has robust performance characteristics, which results in small variations with PVT drift. Also note that for a given input signal slope, it is possible to realize a very small aperture delay (near 0 ps) by appropriately adjusting the size ratio of the input transistors in the two sampling channels.

Application in Simultaneous-Sampling Systems

The proposed sampler can be widely used in various simultaneous-sampling applications, such as high-speed SerDes systems, time-interleaved ADCs, and direct I/Q demodulation systems. As mentioned above, a reduced aperture delay in a SerDes system can dramatically improve performance.

For time-interleaved ADCs and direct I/Q demodulation systems, where two or more ADCs must be well-matched, variations in the aperture delay will produce errors in fast slewing signals. By using the proposed dual-sampling structure, the variation in the aperture delay can be calibrated by adjusting the size ratio of the input transistors in the two sampling channels.

Combining Sampler-Offset Calibration and DFE-Threshold Adjustment

The input offset voltage of the sampler affects the accuracy of the sampler decision, so it should ideally be removed through a calibration mechanism, which adds two differential transistors at the output of the sampler. DFE-threshold adjustment is also very important for the serial-link receiver, and performing DFE-threshold adjustments also adds extra transistors at the output sampler. Hence, in traditional sampler designs, these two necessary functions introduce large parasitic capacitances at the output of the sampler, which can seriously degrade sampler performance.

Figure 8:
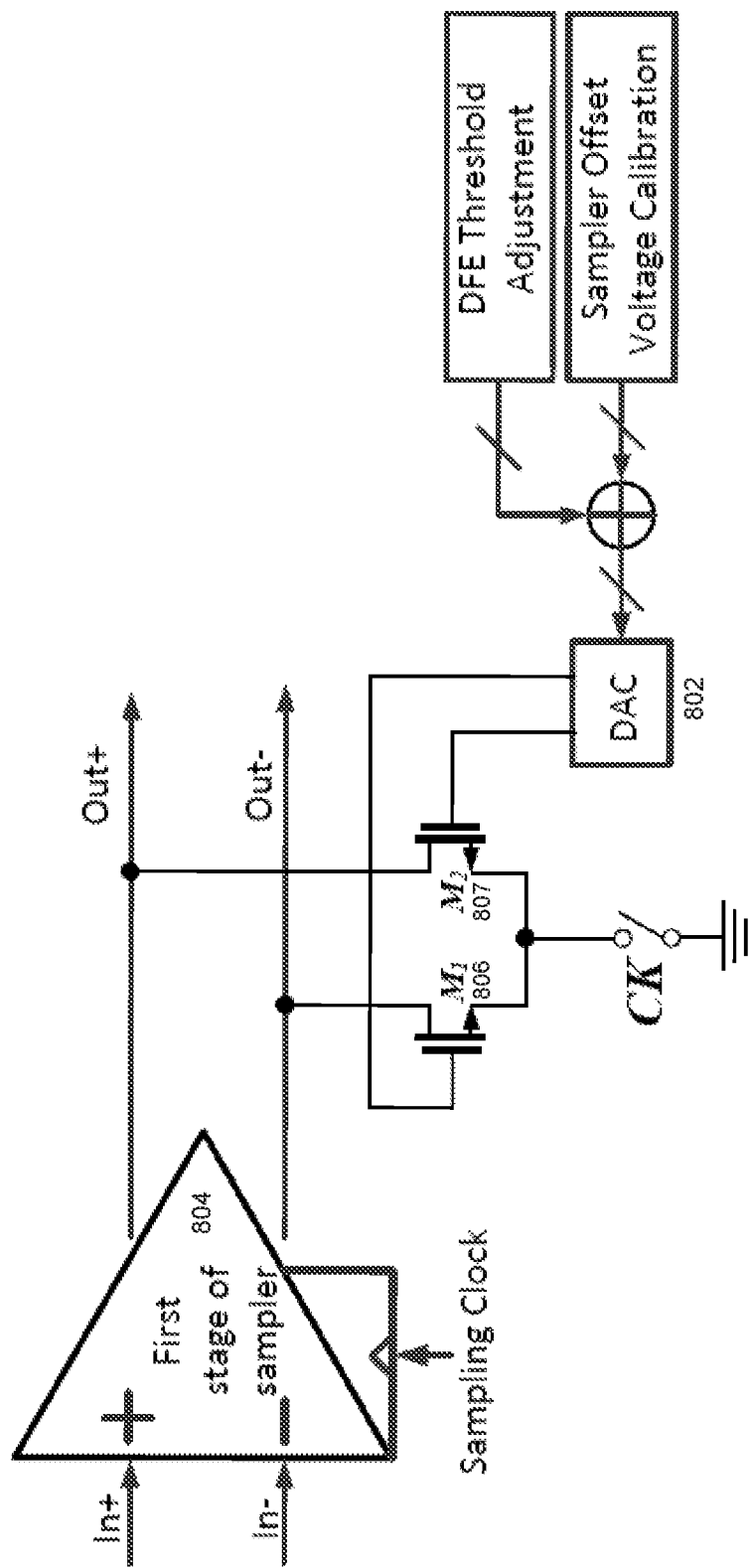
FIG. 8 presents a block diagram for a sampler that combines offset calibration and DFE threshold adjustment in accordance with the disclosed embodiments.

The disclosed embodiments provide a new solution to this problem, which decreases unnecessary parasitic capacitances by combining the offset calibration and the DFE threshold adjustment operations into a single tap comprising two transistors. As illustrated by the exemplary sampler that appears in FIG. 8, only two transistors are connected to the output of the sampler. In this exemplary sampler, the offset-calibration adjustments and the DEE-threshold adjustments are combined in the digital domain into a combined adjustment signal. This combined adjustment signal is then converted into a corresponding analog signal through a DAC 802, and this analog signal is applied to the output of the first stage sampler 804 through two transistors $M_1$ 806 and $M_2$ 807. Note that the results of the offset-calibration and the DEE-threshold adjustment computations can be reused.

Operation of Sampler and Receiver

Figure 9:
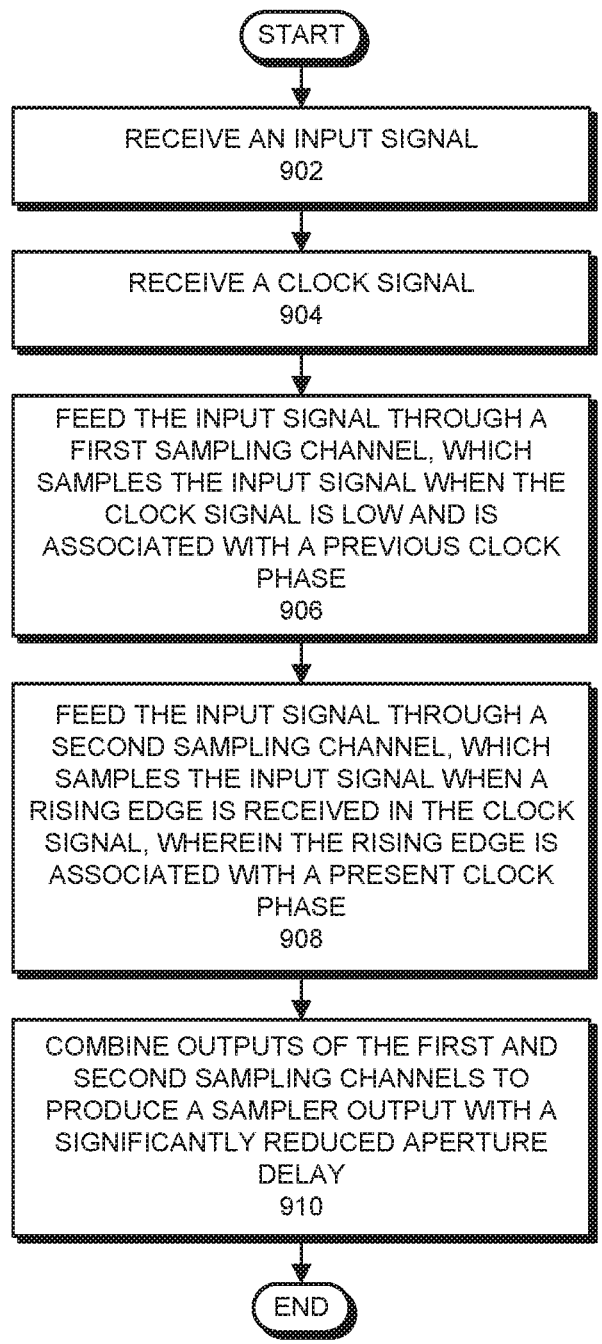
FIG. 9 presents a flow chart illustrating operations performed during the sampling process in accordance with the disclosed embodiments.

FIG. 9 presents a flow chart illustrating operations performed during the sampling process in accordance with the disclosed embodiments. During operation, the system receives an input signal (step 902) and also receives a clock signal (step 904). Next, the system feeds the input signal through a first sampling channel, which samples the input signal when a clock signal is low and is associated with a previous clock phase (step 906). The system also feeds input signal through a second sampling channel, which samples the input signal when a rising edge is received in the clock signal, wherein the rising edge is associated with a present clock phase (step 908). Finally, the system combines outputs of the first and second sampling channels to produce a sampler output with a significantly reduced aperture delay (step 910).

Figure 10:
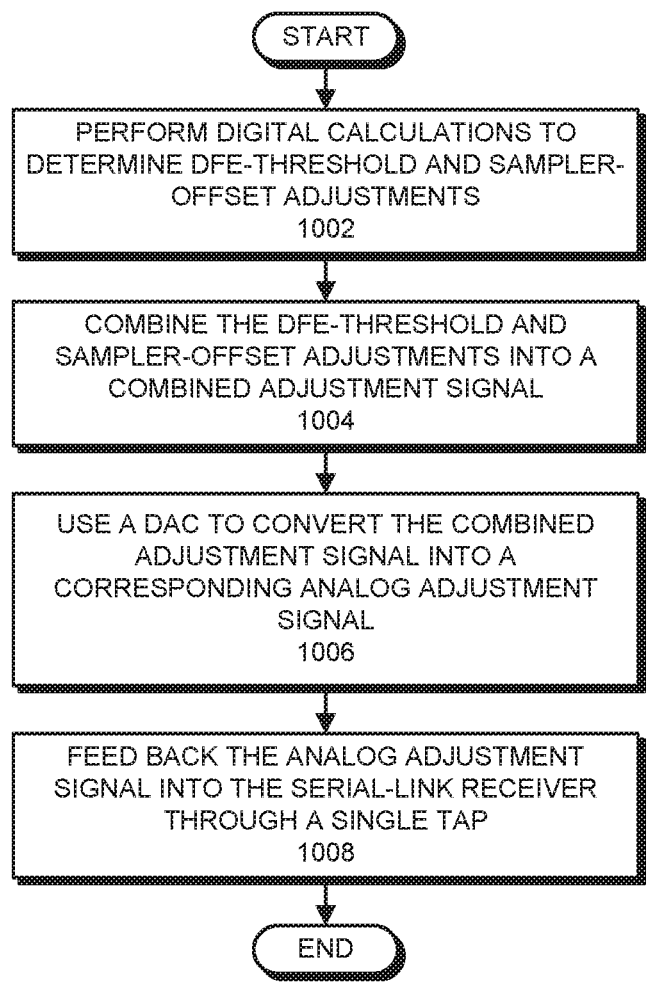
FIG. 10 presents a flow chart illustrating operations related to offset calibration and DFE threshold adjustment, which are performed by the serial-link receiver in accordance with the disclosed embodiments.

FIG. 10 presents a flow chart illustrating operations related to offset calibration and DFE threshold adjustment, which are performed by a system that implements a serial-link receiver in accordance with the disclosed embodiments. During operation, the system performs digital calculations to determine DFE-threshold and sampler-offset adjustments (step 1002). Next, the system combines the DFE-threshold and sampler-offset adjustments into a combined adjustment signal (step 1004). The system then uses a DAC to convert the combined adjustment signal into a corresponding analog adjustment signal (step 1006). Finally, the system feeds back the analog adjustment signal into the serial-link receiver through a single tap (step 1008).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A low-aperture-delay sampler, comprising:
a sampler input, which receives an input signal;
a clock input, which receives a clock signal;
a first sampling channel, which samples the input signal when the clock signal is low and is associated with a previous clock phase;
a second sampling channel, which samples the input signal when a rising edge is received in the clock signal, wherein the rising edge is associated with a present clock phase; and
a combining mechanism, which combines outputs of the first and second sampling channels to produce a sampler output with a significantly reduced aperture delay.

2. The low-aperture-delay sampler of claim 1,
wherein the input is an incoming analog signal; and
wherein the low-aperture-delay sampler comprises a component in a serial-link receiver, which produces a sampled output of the incoming analog signal.

3. The low-aperture-delay sampler of claim 1,
wherein the input is an incoming analog signal; and
wherein the low-aperture-delay sampler comprises a component in a system that supports simultaneous sampling.

4. The low-aperture-delay sampler of claim 3, wherein the system that supports simultaneous sampling comprises one of the following:
a high-speed serializer/deserializer (SerDes) system;
a time-interleaved analog-to-digital converter (ADC) system; and
a direct I/Q demodulation system.

5. The low-aperture-delay sampler of claim 1, further comprising a memory element, which stores an output of the first sampling channel to facilitate combining the output of the first sampling channel with a subsequently received output of the second sampling channel.

6. The low-aperture-delay sampler of claim 1, wherein by combining samples of the input signal from the previous and present clock phases, the low-aperture-delay sampler significantly reduces aperture delay.

7. A serial-link receiver, comprising:
a continuous-time linear equalizer (CTLE);
a decision-feedback equalizer (DFE);
a sampler;
clock-and-data-recovery (CDR) circuits, which dynamically adjust a DFE threshold and a sampler offset, wherein the CDR circuits perform calculations to determine corresponding DFE-threshold and sampler-offset adjustments in the digital domain, and then combine the DFE-threshold and sampler-offset adjustments into a combined adjustment signal; and
a digital-to-analog converter (DAC), which converts the combined adjustment signal into a corresponding analog adjustment signal, which is fed back into the serial-link receiver through a single tap.

8. The serial-link receiver of claim 7, wherein the single tap comprises a pair of transistors coupled to a pair of differential signal lines at the output of the sampler.

9. The serial-link receiver of claim 7, wherein feeding the combined adjustment signal back into the serial-link receiver through the single tap reduces parasitic capacitance as compared with using multiple taps, thereby increasing bandwidth and reducing power consumption.

10. The serial-link receiver of claim 7, wherein performing the calculations in the digital domain to determine the corresponding DFE-threshold and sampler-offset adjustments enables the results of the calculations to be reused.

11. The serial-link receiver of claim 7, wherein the sampler is a low-aperture-delay sampler, comprising:
a sampler input, which receives an input signal;
a first sampling channel, which samples the input signal when a clock signal is low and is associated with a previous clock phase;
a second sampling channel, which samples the input signal when a rising edge is received in the clock signal, wherein the rising edge is associated with a present clock phase; and
a combining mechanism, which combines outputs of the first and second sampling channels to produce a sampler output with a significantly reduced aperture delay.

12. The serial-link receiver of claim 11, wherein the sampler further comprises a memory element, which stores an output of the first sampling channel to facilitate combining the output of the first sampling channel with a subsequently received output of the second sampling channel.

13. The serial-link receiver of claim 7, wherein the serial-link receiver comprises a quarter-rate serial-link receiver.

14. The serial-link receiver of claim 13,
wherein the CTLE is a quarter-rate CLTE;
wherein the DFE is a quarter-rate one-tap DFE with eight high-decision-accuracy samplers; and
wherein the CDR circuits comprise quarter-rate CDR circuits.

15. A method for operating a low-aperture-delay sampler, comprising:
receiving an input signal;
receiving a clock signal;
feeding the input signal through a first sampling channel, which samples the input signal when a clock signal is low and is associated with a previous clock phase;

feeding the input signal through a second sampling channel, which samples the input signal when a rising edge is received in the clock signal, wherein the rising edge is associated with a present clock phase; and combining outputs of the first and second sampling channels to produce a sampler output with a significantly reduced aperture delay.

16. The method of claim 15, further comprising storing the output of the first sampling channel in a memory element to facilitate combining the output of the first sampling channel with a subsequently received output of the second sampling channel.

17. The method of claim 15, wherein by combining samples of the input signal from the previous and present clock phases, the method significantly reduces aperture delay.

18. A method for operating a serial-link receiver, which includes a CTLR, a DFE, a sampler and CDR circuits, the method comprising:

performing digital calculations to determine DFE-threshold and sampler-offset adjustments;

combining the DFE-threshold and sampler-offset adjustments into a combined adjustment signal;

using a DAC to convert the combined adjustment signal into a corresponding analog adjustment signal; and feeding back the analog adjustment signal into the serial-link receiver through a single tap.

19. The method of claim 18, wherein the single tap comprises a pair of transistors coupled to a differential pair of signal lines at the output of the sampler.

20. The method of claim 18, wherein feeding the combined adjustment signal back into the serial-link receiver through the single tap reduces parasitic capacitance as compared with using multiple taps, thereby increasing bandwidth and reducing power consumption.

* * * * *